United States Patent
Dines et al.

(10) Patent No.: US 6,988,083 B2
(45) Date of Patent: Jan. 17, 2006

(54) SALES TRANSACTIONS FOR TRANSFER OF AGRICULTURAL PRODUCTS

(75) Inventors: David Dines, Wayzata, MN (US);
Mark Tracy, Minneapolis, MN (US);
Joseph Stone, Petit Lancy (CH);
Dennis Inman, Eden Prairie, MN (US);
Jeffrey Seeley, Chanhassen, MN (US)

(73) Assignee: Cargill, Inc., Minneapolis, MN (US)

( * ) Notice: Subject to any disclaimer, the term of this patent is extended or adjusted under 35 U.S.C. 154(b) by 312 days.

(21) Appl. No.: 09/862,993

(22) Filed: May 22, 2001

(65) Prior Publication Data

US 2002/0052795 A1 May 2, 2002

Related U.S. Application Data

(60) Provisional application No. 60/245,403, filed on Nov. 2, 2000.

(51) Int. Cl.
*G06F 17/60* (2006.01)

(52) U.S. Cl. .................................................. 705/37
(58) Field of Classification Search ................. 705/37, 705/35, 20, 400
See application file for complete search history.

(56) References Cited

U.S. PATENT DOCUMENTS

| | | | |
|---|---|---|---|
| 3,634,669 A | 1/1972 | Soumas et al. | |
| 4,597,046 A | 6/1986 | Musmanno et al. | |
| 4,598,367 A | 7/1986 | DeFrancesco et al. | |
| 4,674,044 A | 6/1987 | Kalmus et al. | |
| 4,766,539 A | 8/1988 | Fox | |
| 4,774,663 A | 9/1988 | Musmanno et al. | |
| 4,823,265 A | 4/1989 | Nelson | |
| 4,910,676 A | 3/1990 | Alldredge | |
| 4,942,616 A | 7/1990 | Linstroth et al. | |
| 5,003,473 A | 3/1991 | Richards | |
| 5,083,782 A | 1/1992 | Nilssen | |
| 5,101,353 A | 3/1992 | Lupien et al. | |
| 5,132,899 A | 7/1992 | Fox | |
| 5,202,827 A | 4/1993 | Sober | |
| 5,557,517 A * | 9/1996 | Daughterty, III | 705/37 |
| 5,692,233 A | 11/1997 | Garman | |
| 5,721,831 A | 2/1998 | Waits et al. | |
| 5,724,524 A * | 3/1998 | Hunt et al. | 705/37 |
| 5,745,383 A | 4/1998 | Barber | |
| 5,765,141 A | 6/1998 | Spector | |
| 5,774,878 A | 6/1998 | Marshall | |

(Continued)

FOREIGN PATENT DOCUMENTS

JP     11353361 A  * 12/1999

OTHER PUBLICATIONS www.cme.com.*
www.cbot.com.*

*Primary Examiner*—F. Zeender
(74) *Attorney, Agent, or Firm*—Shumaker & Sieffert PA

(57) ABSTRACT

A method for transacting exchanges of agricultural products involves observing the price of an agricultural product at observation points over a period of time. In one embodiment, a maximum price is specified. For each of the observation points, the maximum price is selected when the observed price is greater than the maximum price, and the observed price is selected when the observed price is less than the maximum price. A price is calculated for a quantity of the agricultural product based on the average of the selected prices and a premium. Individual contracts can be aggregated to reach more acceptable trading quantities and intervals, enabling participation of a derivative hedging products service provider and intermediate parties such as elevators and elevator services companies. Aggregation can be carried out manually or automatically, and configured to support anonymity of various parties in the transaction chain.

12 Claims, 2 Drawing Sheets

U.S. PATENT DOCUMENTS

| | | | |
|---|---|---|---|
| 5,774,883 A | 6/1998 | Andersen et al. | |
| 5,884,286 A * | 3/1999 | Daughtery, III | 705/36 |
| 6,263,321 B1 * | 7/2001 | Daughtery, III | 705/36 |
| 2001/0049651 A1 * | 12/2001 | Selleck | 705/37 |
| 2002/0069155 A1 * | 6/2002 | Nafeh et al. | 705/37 |
| 2002/0138400 A1 * | 9/2002 | Kitchen et al. | 705/37 |
| 2003/0083973 A1 * | 5/2003 | Horsfall | 705/37 |
| 2003/0093360 A1 * | 5/2003 | May | 705/37 |

\* cited by examiner

SALES TRANSACTIONS FOR TRANSFER OF AGRICULTURAL PRODUCTS

This application claims priority from U.S. provisional application No. 60/245,403, filed Nov. 2, 2000, the entire content of which is incorporated herein by reference.

TECHNICAL FIELD

The invention relates to the agriculture business and, more particularly, to transactions involving the transfer of agricultural products as market commodities.

BACKGROUND

Agricultural producers face substantial risks in producing an agricultural product, bringing it to market, and earning a profit. Individual farmers, for example, are especially susceptible to risk factors that can adversely affect yield, marketability, and market price. Risk factors include weather conditions such as drought, hail, wind, frost, and excess rain, plant disease, insects, market volatility, increased global capacity, and government regulations. To offset some of the risks associated with market volatility, many producers enter into marketing agreements with buyers of agricultural products.

Marketing agreements often set prices based on futures, and may include quantity requirements, price floors, and price ceilings. With a marketing agreement, the agricultural producer may achieve some level of comfort in his ability to market products at a reasonable price. The marketing agreement thereby reduces the agricultural producer's vulnerability to price risks that can cut into profits and even drive him out of business. In turn, the buyer achieves access to a predetermined quantity of product.

Many buyers hedge the implicit risks associated with the price obligations in the marketing agreement. In general, a buyer's "hedging" involves trading to protect the buyer against the risk of an unfavorable price change from the time the marketing agreement is made to the time that the agricultural products are actually purchased. Hedging may involve trading futures contracts and/or options on futures contracts. Options may be purchased from a derivatives hedging products (DHP) supplier or from another options writer.

SUMMARY

The invention is directed to a method for transacting transfers of agricultural products. The transfer may be transacted between a buyer and a seller who is an agricultural producer, or between a buyer and a seller who is not an agricultural producer. A seller, other than an agricultural producer, may be an entity that buys agricultural products from an agricultural producer and then resells the products to another buyer. Thus, a buyer may contract directly with an agricultural producer or with an intermediary in the form of a buyer/reseller of agricultural products.

In one embodiment, the invention provides a method for transacting transfers of agricultural products, the method comprising observing the price of an agricultural product at observation points over a period of time and specifying a maximum price. The method further provides for selecting a price at each of the observation points, selecting the maximum price in the event the observed price is greater than the maximum price, or selecting the observed price in the event the observed price is less than the maximum price. The method also comprises calculating a price for a quantity of the agricultural product based on the average of the selected prices and a premium above the average, and paying the calculated price to a seller of the quantity of the agricultural product.

In another embodiment, the invention provides a method for transacting transfers of agricultural products, the method comprising observing the price of an agricultural product at observation points over a period of time and specifying a minimum price. The method further provides for selecting a price at each of the observation points, selecting the minimum price in the event the observed price is less than the minimum price, or selecting the observed price in the event the observed price is greater than the minimum price. The method also comprises calculating a price for a quantity of the agricultural product based on the average of the selected prices, less a discount below the average, and paying the calculated price to a seller of the quantity of the agricultural product.

The methods can provide an agricultural producer or other seller with greater price certainty. One method can further provide an agricultural producer a premium in exchange for an agreement to accept a maximum, or "cap," on the price at each of the observation points used to generate the calculated price, or a guaranteed minimum or "floor" price in exchange for a discount. The method produces a "modified" average.

In return, the buyer attracts more producers and resellers, and benefits from greater certainty with respect to supply quantity. The buyer then can hedge the implicit risks associated with the price obligations. Thus, the premium will result in some combination of revenue enhancement and/or hedge protection for the contracting parties.

In another embodiment, the invention provides a method comprising preparing contracts for delivery of quantities of an agricultural product between an elevator and agricultural producers, and aggregating the contracts into a smaller number of contracts between the elevator and a derivatives provider.

The details of one or more embodiments of the invention are set forth in the description below. Other features, objects, and advantages of the invention will be apparent from the description, and from the claims.

DETAILED DESCRIPTION

Figure 1:
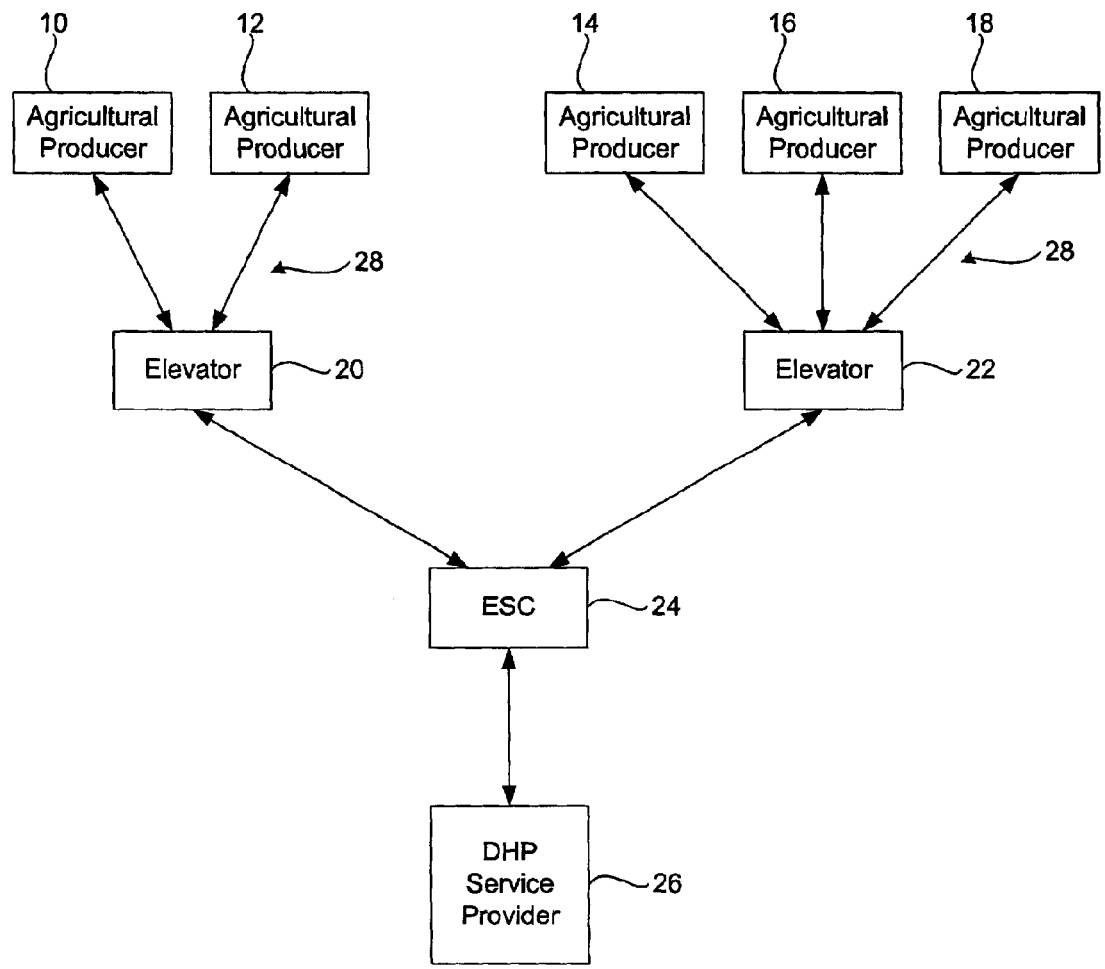
FIG. 1 is a block diagram illustrating a transaction chain for delivery of an aggregated quantity of contract product.

In accordance with the invention, a method for transacting transfers of agricultural products involves observing the price of an agricultural product at observation points over a period of time. The method further involves specifying a maximum price. Then a price is selected for each of the observation points. The maximum price is selected in the event the observed price is greater than the maximum price. Otherwise, the observed price is selected in the event the observed price is less than the maximum price.

In the following discussion, the scenario of a maximum price and a premium will be used, but the method may also involve a minimum price and a discount. As with the maximum price, a price is selected for each of the observation points. The minimum price is selected in the event the observed price is less than the minimum price. Otherwise, the observed price is selected in the event the observed price is greater than the minimum price.

A price is calculated for a quantity of the agricultural product based on the average of the selected prices and a premium or discount. The premium or discount may be set above, equal to, or below the modified average price during a given time frame depending on the specifics of a distinct contract or combination of distinct contracts. Ultimately, a cash price based on the calculated price is paid to a seller of the quantity of the agricultural product.

As a simple example, if there are five observation points during a given period of time, the price for the agricultural product is determined at each observation point. If the agricultural product is corn, for example, the observation points may be the December futures price for corn at the close of trading for five specified days. The contract price for the agricultural product is then the average of the five observation point prices. If any observation point price exceeds the maximum price, however, the maximum price is substituted for that observation point price. So, if the maximum price per unit of an agricultural product is 250.00 cents, and the five observation point prices are 235.00, 245.00, 245.00, 265.00, and 270.00, the last two observation point prices are capped at the maximum of 250.00. Thus, the prices that are used in the averaging calculation are 235.00, 245.00, 245.00, 250.00, and 250.00. The price for the seller is then the calculated average price plus the premium, which is multiplied, as a per unit price, by the applicable quantity to produce the payment amount. The payment amount may be adjusted for various factors, such as for basis or for the quality of the agricultural products.

The term "agricultural producer" may refer to any producer of agricultural products, from an individual farmer to a large corporate farming operation. "Product" produced by the agricultural producer may take the form of crops such as grain, larger vegetables, fruit, cotton, and the like, livestock or animal produce, as well as any byproducts of foregoing products that may be traded as commodities. A "buyer" may take the form of a grain elevator, processing plant, or other point of delivery for a producer's output, an integrated agricultural products provider, or an entity or collection of entities that purchase agricultural products and trades agricultural commodities and options on the open market. A "seller" may be an agricultural producer or any entity that buys agricultural products from an agricultural producer or elsewhere and resells them to a buyer. Thus, the seller may be a reseller or "middleman" who trades in agricultural products. An agreement in support of the transaction may be between an agricultural producer and a buyer, or between a buyer/reseller and a buyer. Thus, a buyer/reseller may have contractual obligations to both the buyer and the producer, and can be viewed as an intermediary.

A method in accordance with the present invention agreement provides an alternative to sellers such as agricultural producers and buyer/resellers. It provides an additional premium over a modified average price observed during a given time frame for a quantity of agricultural product to be transferred. To help make the premium feasible for both the buyer and the seller, however, the method requires a price limit in the form of a maximum price. The price at each observation point is compared to the maximum price, the smaller of which is used in the modified average calculation. In this manner, a buyer's customer, e.g., an agricultural producer, can get paid the average plus a known premium. Conversely, a seller's customer, e.g., an agricultural commodities trader, can be assured that the averaging points used to produce the calculated price will not exceed a maximum price. This type of contract gives the farmer the average plus a premium, enabling him to beat the conventional average price under some circumstances. Each input (observation point price) into the average calculation is capped but at a very attractive level for the agricultural producer. Also, the contract can be arranged as a zero cost contract.

Notably, there is no limit on how low the average price may go for purposes of calculating the price. However, the premium provides some degree of fixed compensation against excessive drops in average price. Thus, the premium is earned in exchange for placing a limit on the price for each observation point. The premium may be paid or received at any time agreed upon by the parties. Timing of payment could result in implicit financing revenue or cost to either of the parties.

Also, the resulting sale can be combined with an option in a single contract to achieve all of the seller's objectives while still remaining in compliance with existing regulations. In particular, the maximum price limit on the average price can be modeled as an option extending between the seller and buyer. In effect, the seller sells the buyer an option to purchase at the maximum price at each observation point. The option has value if the market price exceeds the maximum price at the observation point. In practice, the buyer will agree to purchase some quantity of product from the producer or reseller and pay the average of an observed price over a known period of time. Again, in exchange for the known premium, the producer or reseller foregoes the value of any averaging points in excess of the maximum price limit.

The arrangement may be modeled as a purchase by a buyer of a strip of options from the seller. The options, which may be structured as calls, puts or both, expire at different times. The options may expire daily, or the options may expire less frequently. The model may value the options in the strip individually, or the model may value the options in the strip in the context of the running average obtained from the observed prices at past observation points. Unlike a publicly-traded option, however, it will ordinarily be mandatory for the seller to make delivery, and for the buyer to take delivery.

In theory, an agricultural producer or reseller could obtain an average price by his own efforts, without having an arrangement with a buyer. In practice, however, it would be difficult for an agricultural producer or reseller to attain such a result by individual effort. To receive an average price, a producer or reseller must take the time and effort to sell a portion of the agricultural product every day. This generally is not practical due to time demands and the fact that trading increments in organized markets are unlikely to exactly match the necessary quantity per averaging period. The typical size range for a producer or reseller does not support the necessary daily activity and trading increments.

Aggregation can avoid the above problems and thereby facilitate implementation of the method. In particular, manual or automated aggregation of individual contracts can provide administrative efficiency and convenience to some parties. Aggregation of contracts can also be used to generate larger and more practical trading increments.

In addition, aggregation of individual contracts can provide identity protection, i.e., anonymity, to any party desiring it for its customer/client base or itself depending on the party's place in a given supply chain. Confidentiality of the individual elevators or producers involved in the transaction chain can be assured. An intermediate reseller need not disclose the identities of the parties on opposite sides of the intermediate reseller in the transaction chain. Anonymity helps intermediaries preserve their relationships with customers. This is desirable because, in some cases, the supplier to the intermediary may have other parts, divisions, or departments in its organization that could compete head-to-head with the intermediary for business. If identity is preserved, however, an impediment to potential new business between the customer and intermediary is eliminated. In other words, the parties can transact business with less fear of exchanging sensitive information to the detriment of either party's business. Confidentiality of the individual elevators or producers involved in the transaction chain can be assured. In particular, the intermediate reseller need not disclose the identities of the parties on opposite sides of the reseller in the transaction chain.

Aggregation of quantities can be done manually by an intermediary receiving contract quantities from its locations or staff by any conventional mode of communication such as verbal, facsimile, telephone, mail, email and the like. This approach would require one or more persons associated with the intermediary to manually sort the contract quantities and notify a derivatives dealer of an aggregated quantity. Although manual aggregation is workable, it may be slow and prone to human error.

Automated aggregation is generally more efficient. Automated aggregation makes the frequent or even infrequent accumulation of small quantity individual contracts readily efficient. The contracts are therefore more manageable. The result is that parties can transact in practical quantities relative to trading increments, and the quantities can be updated at frequencies ranging from fractions of an hour to weeks or months. By aggregating, the buyer can enhance revenue and achieve hedge protection on a practical level.

Accordingly, it may be desirable to receive and aggregate quantities automatically, for example, using a computer network such as the internet. Private wide area networks and the use of intranet servers also may be used to aggregate quantities. In each case, the intermediary may load quantities into an aggregation engine running on a local workstation or a remote server.

Typically, those contracts to be aggregated are executed during a sign-up period. At that time, the terms of averaging will be known to the buyer and all participating sellers. In particular, the observation points and maximum price will be known. At the conclusion of the sign-up period, the total aggregated quantity will be known as well.

Pricing, analysis and hedging of contracts can be done using a combination of recorded known averaging points and remaining unknown averaging points, which may be modeled as strip option values, all adjusted for present value. To automate the process, a model can be employed that calculates the value of the aggregated contracts and the hedging measurements and/or requirements. The benefit of over-the-counter derivatives can be realized across the agricultural product supply chain by embedding them into the physical delivery contract.

The aggregated and, advantageously, anonymous quantity is then delivered to an options provider, such as a DHP service provider. Communication of the automatically aggregated quantity to the DHP service provider may take place manually or via intranet or Internet tools.

As an example, assume that today is Sep. 1, 2002 and that December 2003 corn futures are trading at 235.00 (cents per bushel) at the Chicago Board of Trade. A farmer wishes to sell his corn to an elevator for future delivery in September 2003. The farmer would like to earn a price in excess of the average observed between September 2002 and September 2003, if prices remain depressed or move lower, and would like the opportunity to participate somewhat in the event of rising prices if they occur. In addition, the farmer believes the prices are unlikely to sustain increases above 265.00 and would find that price acceptable for sale of his output.

Therefore, the farmer is willing to forego potential averaging point gains above 265.00, in exchange for being guaranteed a premium of 5.00 cents per bushel above the ultimate "modified" average. In this example, the farmer may agree that no averaging point (i.e., observation point price) can have a value in excess of 265.00, the maximum level. Thus, for this scenario, a maximum payment of 270.00 (the maximum of 265.00 plus the 5.00 cent premium) per bushel is possible if every observation point price was at or above 265.00.

Assume further that an elevator at which the farmer wishes to sell his output is owned by a company that has a DHP service. Consequently, the sale of the physical grain can be combined, in financial effect, with a swap agreement in a single contract to achieve all of the farmer's objectives and remain in compliance with federal regulations, e.g., Commodities Future Trading Commission (CFTC) regulations.

A "swap agreement" may refer to an agreement in which one party agrees to deliver a fixed price for a given quantity of goods to another party that agrees to deliver a variable price for the same quantity of goods. Typically, a swap agreement converts a varying or unpredictable cost into a fixed or known cost. Goods can include anything with an observed and potentially variable price. The way that the price varies can be based on direct observation, or based on some predefined mathematical formula(s) using directly observed input(s) which may vary in value. The number of times that payments are exchanged can be from one to infinity, but the dates of the observations that determine the payments, and the timing of the payments once determined, are properly defined in advance.

The farmer and the buyer, i.e., the elevator, may agree to set a term with a beginning and an ending for the averaging and set a maximum limit of 265.00 for each observation point price. With a method in accordance with the invention, these objectives can be achieved. The transaction is tied to a physical delivery. The farmer is ordinarily committed to make physical delivery, and the elevator is ordinarily committed to take delivery.

In a first case, where prices fall from 235.00 on Sep. 1, 2002 to 188.00 on Sep. 14, 2003, earning an average of 209.15 is better for the farmer than taking the ending value. In addition, earning the extra 5.00 cents above the average for total of 214.15 is an even better outcome for the farmer.

In a second case, where prices rise from 235.00 on Sep. 1, 2002 to 256.00 on Sep. 14, 2003, the farmer is rewarded by a good market and is ultimately paid based upon the average of 252.75 plus 5.00 cents for a total of 257.75.

In a third case, where prices rise from 235.00 on Sep. 1, 2002 to 276.00 on Sep. 14, 2003, the farmer receives the modified average of 261.93 plus the premium of 5.00 for a total of 266.93. This result is more than the 265.00, which should be found acceptable by the farmer.

In a fourth case, where prices rise from 235.00 on Sep. 1, 2002 to 311.00 on Sep. 14, 2003, the farmer receives the average of 264.66 plus a premium of 5.00 for a total of 269.66. Again, this result is in excess of the price the farmer found acceptable, particularly in light of the premium agreed upon by the farmer and the buyer. At the same time, the buyer benefited from a maximum limit (265.00) on the average price, and was better able to gauge the risk of rising prices and hedge that risk appropriately.

The above example is made especially feasible by an aggregation technique in accordance with the invention, such as automated aggregation and aggregation with anonymity. To make the benefits of derivative-based hedging products available to the majority of farmers who cannot reasonably trade directly with the DHP service, it is desirable to make the benefits of the derivative-based hedging products available through the elevators themselves.

In one simple form, a company with a DHP service provides the derivative-based hedging product to an independent elevator, who would then pass the financial benefits of the derivative-based hedging product onto the farmer in the form of a physical contract between the farmer and the elevator. For this approach, the independent elevator should be swap-eligible under applicable regulations, e.g., CFTC regulations. In addition, the independent elevator and the company with the DHP service should mutually evaluate and accept each other's credit risk. Then, the company with the DHP service would be responsible for educating and servicing the needs of the independent elevator merchants as they serve their farmer/customers.

Meeting all of the above conditions can be impractical. Ordinarily, it will not be cost-effective for the company with the DHP service to have a swap relationship with a single elevator. The transaction quantity is too small to justify the initial and maintenance credit work. Further, even if the credit issues did not exist, the likely trading size and frequency of individual farmer trades that would be passed from the farmer to the company with the DHP service via the independent elevator would most often be too small and of a frequency that is economically unrewarding. The company with the DHP service also may have difficulty in efficiently educating and serving the needs of individual farmers and elevators.

To overcome these hurdles, a method of reaching a greater number of elevators with a single entity or shortened list of swap relationships is desirable. Also, it is desirable to aggregate the individual farmers' contracts so that they can be delivered to the DHP service in economically practical quantities and at acceptable frequencies. Aggregation can be realized in the DHP service as a swap agreement with an intermediary that owns, is owned by, and/or services a significant group of independent elevators. For simplicity, we can refer to this intermediate entity as an elevator service company (ESC). Having a relationship with an ESC allows the DHP services provider to maintain only one swap and credit arrangement, but gain access to the output of a wide variety of elevators and ultimate customers/farmers. Thus, for the same or similar fixed and variable cost, many independent elevators and/or farmers can be reached with one of only a few swap, credit, and education relationships to maintain.

The DHP service provider delivers the financial hedge component of the marketing contract to the ESC, who in turn delivers it to its member elevator network. The member elevator can then combine the financial hedge with the physical crop purchase contract to provide an innovative marketing contract to its farmer base. In addition, the DHP service provider can provide the ESC with support in the form of marketing materials, contract language, derivative hedging product education, and transaction reporting and monitoring. The DHP service provider may elect, for example, to split some of the profit with the ESC and/or pay the ESC a flat fee in exchange for marketing the derivative hedging product. Alternatively, the DHP service provider may not split revenue. In some cases, the DHP service provider may require that the ESC pay a fee to the DHP service provider to gain access to the derivative hedging product. Fees may be charged or exchanged at one or more levels in the transaction chain. In return, the DHP service provider could require that the ESC leverage its marketing power for the distribution of the derivative hedging product.

The ESC and its related elevators will already have an infrastructure, which efficiently services frequent farmer trades, education needs, and credit issues of small size and low frequency. When these trades include a solution provided by a DHP service provider as described herein, the DHP portion of the trade can be communicated back to the DHP service provider at a predetermined time and/or at predetermined quantity intervals via phone, facsimile, mail, or email. Thus, the DHP service provider will be able to help farmers it could not otherwise help economically and legally, with all parties remaining in compliance with applicable regulations.

In one embodiment, aggregated trading information can be communicated using an Internet or intranet-based tool that automatically provides all of the necessary trading information to the ESC and the DHP service provider. The pertinent information, such as quantity, averaging term, maximum average limit, and contract privity data, can be entered into a computer workstation at the elevator/merchant level and passed all the way through to the DHP service provider. Alternatively the information can be entered by the ESC and sent directly to the DHP service provider. A software application running on the workstation into which the information is loaded can be configured to aggregate individual quantities and generate new aggregated agreements for presentation by the ESC to the DHP service provider.

For some embodiments, it is conceivable that the initial information creating a contract with the elevator or ESC could even be entered by a farmer via the Internet. From that point forward, the information entered by the farmer may be handled in an automated manner for submission to the ESC and for generation of appropriate contracts. Indeed, the information entered by the farmer may be handled automatically not only for the ESC but also subjected to automated aggregation for presentation to the DHP service provider.

In this manner, the entire chain between the farmer, the elevator, the ESC, and a DHP service provider can be automated to deliver aggregated contracts that can be handled more efficiently by the DHP service provider. The necessary applications software devoted to the automated aggregation function can be embodied as software loaded on a computer workstation that interacts with additional computers via appropriate communications ports. Alternatively, the application software may be embodied as HTML or other web page code executable by a web browser, along with both client side and server side scripting as appropriate.

Thus, the farmer may be equipped with a web browser for data entry, while the elevator or ESC maintains a web server running an aggregation engine that accumulates the data for several farmers and packages it into an aggregated contract that satisfies the necessary trading quantity and frequency. The aggregated contract may then be forwarded to a web server associated with that DHP service provider, which electronically delegates and accepts the aggregate contract, with or without human intervention, completing the transaction chain. When delivery has been made, or at some earlier or later time as agreed upon by the parties, the DHP service provider pays the ESC. The ESC is responsible for payment to an elevator, while the elevator is responsible for payment to the farmer/customer. Like the aggregation process, the payment process can be executed automatically. For example, aggregate payments made by the DHP service provider can be aggregated by the ESC in paying its customers, whether they be individual elevators or farmers.

Aggregation and automation provides many benefits to each party involved in the supply chain. At the same time, however, there are potential business threats to the intermediate parties between the farmer and the DHP service provider. If a DHP service provider knows the identity of the ultimate farmer/customer, it is capable of eliminating the middleman so to speak, and cutting the ESC or elevator out of the transaction chain for a variety of derivative hedging product opportunities. This is especially the case if a DHP service provider has a presence in the same geography as the particular elevator involved in the transaction. Further, if a DHP service provider knows that a specific elevator is experiencing high-level business, the ESC could feel threatened by the possibility that the DHP service company could purchase the elevator or eliminate the ESC in some other way.

By providing anonymous aggregation in accordance with the invention, however, threats to the ESC can be reduced significantly. Anonymity can be readily accomplished by filtering information as it flows through the automated channels between the farmer, the elevator, the ESC, and the DHP service provider. Specifically, the arrangement between the ESC and the DHP service provider can be configured to pass on only the information that the DHP service provider needs to know in order to serve the ESC in providing hedging products.

If the geographical business area for the elevator overlaps with one covered by a company that is related to or owned by the DHP service company or a holding company thereof, the elevator customer information could be learned by a competitor for use in business that does not pertain to the functions served by the DHP service company. Consequently, the elevator could lose both core cash grain business and its share of derivative hedging revenue to a newly informed competitor.

In addition to its defensive value, anonymity can provide a marketing benefit. If the ESC has valuable brand name recognition with its elevator and/or farmer customers, and its brand name recognition exceeds that of the brand name associated with the DHP service provider, there may be an advantage in private labeling of the derivative hedging products. In other words, use of the ESC brand name in lieu of the brand name of the originator of the hedging product, i.e., the DHP service provider, may be more effective in a given market segment. Thus, anonymity works in the opposite direction to that described above, concealing the identity of the DHP service provider from the individual elevators or producers. In this case, anonymity is a significant benefit to both the ESC and the DHP service provider.

Although the aggregation and anonymity features may be particularly useful for products such as those described herein, i.e., maximum average contracts and the like, they are not limited in that regard. On the contrary, the aggregation and anonymity features can be exploited for a variety of products, and especially those where administrative overhead, quantity, and frequency issues make handling of individual transactions difficult and inefficient for the typical DHP product provider. An example of a transactional method to which the aggregation and anonymity features may be readily applied is that disclosed in U.S. provisional application Ser. No. 60/245,318, to David E. Dines et al., entitled "Sales Transactions for Transfer of Agricultural Products," filed Nov. 2, 2000. Notably, aggregation and anonymity may be greatly facilitated by the proliferation of Internet technologies, and may find use on a widespread basis in a variety of transactions involving agricultural commodities.

FIG. 1 is a block diagram illustrating a transaction chain for delivery of an aggregated contracts product. As shown in FIG. 1, DHP service provider 26 may interact with ESC 24 by executing a financial swap with the ESC 24 and also paying ESC 24 a fee to market the derivative product (32). ESC 24, in turn, executes a financial swap with one or more individual elevators 20, 22 (30). Individual elevators 20, 22 offer the contract (28) to each of a number of agricultural producers 10, 12, 14, 16 and 18. Agricultural producers 10 and 12 are in privity with elevator 20, and agricultural producers 14, 16 and 18 are in privity with elevator 22. Elevators 20 and 22 are in privity with ESC 24.

ESC 24 and the DHP service provider 26 are in privity with one another. The quantities produced by each agricultural producer can then be aggregated at the level of elevator 20 or 22 and/or at the level of ESC 24 and passed upstream to DHP service provider 26. Each agricultural producer, as to his individual quantity, receives an assurance of an average price plus a premium, subject to a maximum average limit. Notably, the structure shown in FIG. 1 facilitates anonymity.

As shown in FIG. 1, ESC 24 and DHP service provider 26 swap cash flow (32). As an example, ESC 24 could be paid an average from Apr. 1, 2002 to Jul. 14, 2002. In exchange, the DHP service provider 26 may receive from ESC 24 the closing price for the appropriate commodity on Jul. 14, 2002 (32). ESC 24 may pay elevators 20 and 22 an average from Apr. 1, 2002 to Jul. 14, 2002 plus a premium (30). In turn, ESC 24 receives from elevators 20 and 22 the closing price for the appropriate commodity on Jul. 14, 2002 (30). Elevators 20 and 22 then pay the average plus the premium to agricultural producers 10, 12, 14, 16 and 18 for their crop. Elevators 20 and 22 may sell futures on Jul. 14, 2002 to offset their obligations. Thus, the payments between an elevator and an agricultural producer are physical contract payments tied to delivery of the crop (28).

In this way, agricultural producers 10, 12, 14, 16 and 18 obtain financial benefits of hedging products without dealing with DHP service provider 26 directly. Although agricultural producers 10, 12, 14, 16 and 18 may know the financial arrangements that make the contracts (28) economically viable, it is not essential to the invention that agricultural producers 10, 12, 14, 16 and 18 have this knowledge. The contracts (28) between agricultural producers 10, 12, 14, 16 and 18 and individual elevators 20 and 22 need not mention hedging products or DHP service provider 26.

Figure 2:
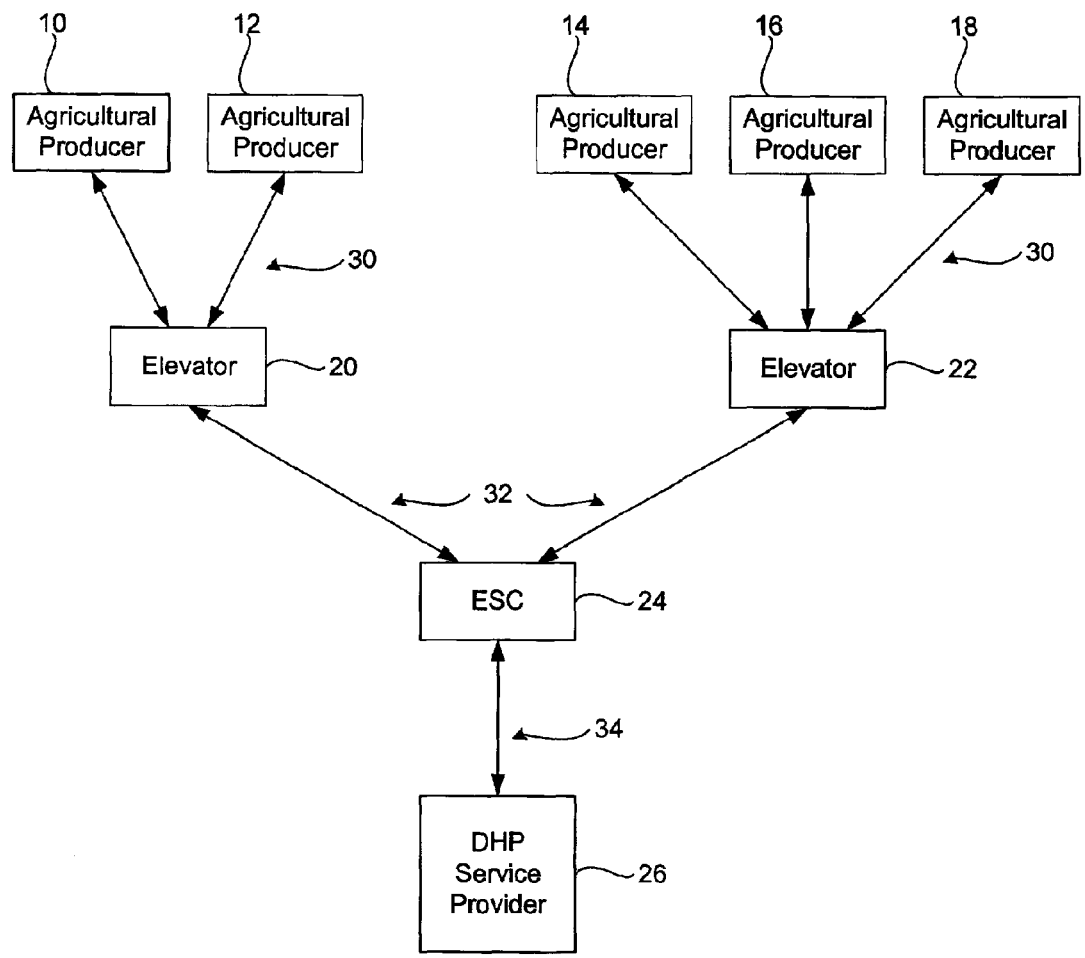
FIG. 2 is a block diagram illustrating provision of support to the transaction chain illustrated in FIG. 1.

FIG. 2 is a block diagram illustrating provision of support to the transaction chain illustrated in FIG. 1. As shown in FIG. 2, DHP service provider 26 may provide to ESC 24 necessary education, marketing materials, and products support (34) to facilitate delivery of a transactional product as described herein. In turn, ESC 24 may pass along such features to individual elevators 20 and 22 (32), who then support individual agricultural producers 10, 12, 14, 16 and 18 (30).

A number of embodiments of the present invention have been described. Nevertheless, it will be understood that various modifications may be made without departing from the spirit and scope of the invention. Accordingly, other embodiments are within the scope of the following claims.

What is claimed is:

1. A method for transacting transfers of agricultural products, the method comprising:

preparing contracts for delivery of quantities of an agricultural product between an elevator and agricultural producers;

executing a software application on a computer to aggregate the contracts into a smaller number of contracts between the elevator and a derivatives provider;

observing the price of the agricultural product at observation points over a period of time;

specifying a minimum price;

for each of the observation points, selecting the minimum price in the event the observed price is less than the minimum price, and selecting the observed price in the event the observed price is greater than the minimum price;

calculating a price for a quantity of the agricultural product based on the average of the selected prices and a discount below the average; and paying to each agricultural producer an amount based upon the calculated price.

2. The method of claim 1, further comprising executing a financial swap between the elevator and the derivatives provider.

3. The method of claim 1, further comprising:

executing a financial swap between the elevator and an elevator service company; and executing a financial swap between the elevator service company and the derivatives provider.

4. The method of claim 1, further comprising receiving a marketing fee from the derivatives provider.

5. The method of claim 1, further comprising hedging the risks of the aggregated contracts.

6. The method of claim 1, further comprising maintaining anonymity between the derivatives provider and the agricultural producers.

7. A method for transacting transfers of agricultural products, the method comprising:

preparing contracts for delivery of quantities of an agricultural product between an elevator and agricultural producers;

executing a software application on a computer to aggregate the contracts into a smaller number of contracts between the elevator and a derivatives provider;

observing the price of the agricultural product at observation points over a period of time;

specifying a maximum price;

for each of the observation points, selecting the maximum price in the event the observed price is greater than the maximum price, and selecting the observed price in the event the observed price is less than the maximum price;

calculating a price for a quantity of the agricultural product based on the average of the selected prices and a premium above the average; and paying to each agricultural producer an amount based upon the calculated price.

8. The method of claim 7, further comprising executing a financial swap between the elevator and the derivatives provider.

9. The method of claim 7, further comprising:

executing a financial swap between the elevator and an elevator service company; and executing a financial swap between the elevator service company and the derivatives provider.

10. The method of claim 7, further comprising receiving a marketing fee from the derivatives provider.

11. The method of claim 7, further comprising hedging the risks of the aggregated contracts.

12. The method of claim 7, further comprising maintaining anonymity between the derivatives provider and the agricultural producers.

* * * * *